United States Patent [19]
Milner

[11] Patent Number: 5,617,245
[45] Date of Patent: Apr. 1, 1997

[54] REAR VIEW MIRROR UNIT

[76] Inventor: Peter J. Milner, 8 Juliet Close, Nuneaton, Warwickshire CV11 6NS, United Kingdom

[21] Appl. No.: 129,194

[22] PCT Filed: Apr. 10, 1992

[86] PCT No.: PCT/GB92/00659

§ 371 Date: Oct. 27, 1995

§ 102(e) Date: Oct. 27, 1995

[87] PCT Pub. No.: WO92/18353

PCT Pub. Date: Oct. 29, 1992

[30] Foreign Application Priority Data

Apr. 10, 1991 [GB] United Kingdom ............... 9107551

[51] Int. Cl.⁶ ............................................. B60R 1/06
[52] U.S. Cl. ..................... 359/402; 359/833; 359/837; 359/838
[58] Field of Search ............... 359/833, 837, 359/838, 737, 402

[56] References Cited

U.S. PATENT DOCUMENTS

| | | | |
|---|---|---|---|
| Re. 30,673 | 7/1981 | Feinbloom | 359/837 |
| 829,121 | 8/1906 | Neumayer et al. | 359/401 |
| 1,644,902 | 10/1927 | Voigt | 359/503 |
| 1,883,296 | 10/1932 | Johnson | 359/837 |
| 1,907,800 | 5/1933 | Harrington | 359/837 |
| 1,939,311 | 12/1933 | Mort | 359/503 |
| 2,398,354 | 4/1946 | Brinkley | 359/857 |
| 2,501,067 | 3/1950 | Lusebrink | 350/833 |
| 2,570,357 | 1/1951 | Martin | 359/364 |
| 2,757,575 | 8/1956 | Kovach | 359/503 |
| 2,963,936 | 12/1960 | Court | 359/837 |
| 2,992,593 | 7/1961 | Hyde | 359/364 |
| 3,001,449 | 9/1961 | Hyde | 359/364 |
| 3,001,450 | 9/1961 | Hyde | 359/364 |
| 3,059,519 | 10/1962 | Stanton | 359/482 |
| 3,280,700 | 10/1966 | Donelly et al. | 359/402 |
| 3,441,335 | 4/1969 | Johnson | 359/364 |
| 3,456,999 | 7/1969 | Hopp | 359/402 |
| 3,601,477 | 8/1971 | Miyazaki | 359/737 |
| 3,794,411 | 2/1974 | Gray | 359/838 |
| 3,809,461 | 5/1974 | Baumgardner et al. | 359/737 |
| 3,914,028 | 10/1975 | Toy | 359/832 |
| 4,385,811 | 5/1983 | Nava | 350/434 |
| 4,688,905 | 8/1987 | Okamura | 359/737 |
| 5,278,695 | 1/1994 | Gebelein et al. | 359/419 |

FOREIGN PATENT DOCUMENTS

| | | | |
|---|---|---|---|
| 0283467 | 9/1988 | European Pat. Off. | 359/838 |
| 1806785 | 3/1972 | Germany | B60R 1/08 |
| 2348206 | 4/1974 | Germany | 359/837 |
| 2914361 | 10/1980 | Germany | 359/837 |
| 3146486 | 6/1983 | Germany | B60R 1/08 |
| 3335981 | 4/1985 | Germany | 359/838 |
| 462649 | 11/1951 | Italy | 359/402 |
| 504651 | 3/1957 | Italy | 359/402 |
| 615983 | 1/1961 | Italy | 359/402 |
| 5330383 | 12/1993 | Japan | 359/833 |
| 9006866 | 6/1990 | WIPO | B60R 1/08 |

*Primary Examiner*—Paul M. Dzierzynski
*Assistant Examiner*—John Juba, Jr.
*Attorney, Agent, or Firm*—Morrison Law Firm

[57] ABSTRACT

A rear view mirror unit of the type in which light from a region behind an observer is directed to the observer's eye by an optical system including a reflecting component and a refracting component in which the refracting component of the optical system includes a plurality of refracting interfaces inclined to one another and including first and second interfaces of an objective refractor, which converge towards a first side of the longitudinal median plane of the unit and third and fourth interfaces of an ocular refractor which converge towards a second side of the longitudinal median plane of the unit opposite the first. The ocular retractor is transversed twice by the light in its path to the observer's eye from the object, and the refractors may be formed as Fresnel prisms.

19 Claims, 6 Drawing Sheets

REAR VIEW MIRROR UNIT

The present invention relates generally to a rear view mirror unit, and particularly to a rear view mirror unit suitable for a vehicle such as a motor vehicle, although the rear view mirror unit of the present invention may also be used for other vehicles, such as aircraft and railway vehicles.

Mirrors in general are used to deflect light from its incident direction to a reflected direction and in so doing, according to the laws of geometric optics, to direct the light towards an observer's eye in such a way as to create a virtual image which appears in front of the observer. In this way an observer whose attention must not be diverted from forward vision, such as the driver of the vehicle, can nevertheless observe the positions and movements of objects behind him by quickly glancing towards the rear view mirror.

Conventionally rear view mirrors used for vehicles comprises a single flat or spherically curved reflector positioned forwardly of -he observer at a location enabling it to deflect light from a region behind the observer with a single reflection towards the observer's eyes. The lateral field of view available to the observer is dependent on the lateral width of the mirror, its radius of curvature and its proximity. The closer the mirror to the observer's eye the wider the field of view. Internally fitted rear view mirrors having a considerable width are frequently fitted to vehicles at or near the upper part of the windscreen so as to gather light entering the vehicle from the region behind it through a rear window. It is not possible, however, to extend the field of view over the whole region of interest, because of view-obstructing parts of the vehicle, and in order to cover a wider field, wing or door mirrors have been utilized. Wing mirrors, mounted on the front wings of the vehicle have in more recent times been superseded by door-mounted mirrors because of their greater proximity to the observer, giving a wider and more satisfactory field of view.

Unfortunately, however, door-mounted external rear view mirrors, which by definition must extend beyond the lateral boundaries of the vehicle, have two major disadvantages, the first of which is the increased air resistance due to their cross-sectional area and projection from the body, and the second (due to the same factors) is the potential hazard they offer to other road users. To cope with this latter the majority of external rear view mirrors are mounted on snap-release or spring biased mountings which enable the mirror to be folded back in the event of an impact. This arrangement, however, is inadequate at higher speeds and only really satisfactory at extremely low speeds where the mass of the external mirror can be neglected in determining the impact force.

German Offenlegungsschrift DE 3146486 A1 discloses a rear view mirror in which an attempt to reduce the lateral extent of the mirror is made by the provision of a refracting element on the outside of a side window for directing light from the outside of the vehicle towards a reflector on the interior of the vehicle so as the produce a virtual image in the same position as it would be formed by a plane reflector in a conventional position outside the window. This device suffers from a number of disadvantages, not least of which is that, in one embodiment total internal reflection destroys the image and in another the size of the refractors required for an adequate field of view would be excessive.

Another attempt to produce a wide angle rear view mirror which does not have a great lateral extent is described in German Patentschrift DE 3335981 C2. The device includes a plurality of refractors for deflecting the light as well as a plurality of reflectors for bending the light through 180° in a system similar to binocular prisms. This system suffers from complexity and, consequently, from great expense, particularly in the production of an adequate number of high quality optical components. The practical implementation of such a highly complex system would be extremely difficult and furthermore it would suffer from the disadvantage of forming a very narrow exit pupil so that the observer would only be able to see the image from a very restricted position. Other problems which are encountered with prior art attempts to produce a low profile rear view mirror include that of total internal reflection (a problem to which the system disclosed in DE 3146486 A1 described above would be subject) and dispersion resulting from the frequently observed phenomenon in which the phase velocity of a wave is a function of frequency. This phenomenon degrades an image resulting from the passage of light through a material having a relatively high dispersion power, that is the ratio of the difference between the absolute refractive indices of the medium at opposite ends of the visible spectrum.

The present invention seeks to provide a low profile rear view mirror in which the above disadvantages of the prior art are overcome and, in particular, in which a desirably low profile mirror unit can be produced without the complexity of a large number of optical components and the risk of total internal reflection degrading or destroying the image. Embodiments of the present invention can be produced with relatively few optical components and it is an important consideration that the angles of incidence of the light it is desired to transmit are not close to the critical angle. A preferred feature of the present invention is that the reflector may extend both inside and outside the body of a vehicle. Various provisions to deal with the problems of dispersion and secondary reflection involving such technical measures as the choice of material, the shape, position and orientation of the optical components and any optical coatings thereon will be defined in more detail herein below.

According to the present invention there is provided a rear view mirror unit in which the light from a region behind an observer is directed to the observer's eye by an optical system comprising refracting means and reflecting means, characterized in that the refracting means comprise a first refractor for diverting incident light towards the reflecting means, and a second refractor, positioned such that light from the first refractor is incident thereon, and for directing light from the reflecting means towards the observer, and in that the second refractor has at least one refracting interface positioned such that light passing through that refractor traverses the said one refracting interface twice before reaching the observer.

In the preferred embodiment of the invention the said one refracting interface is defined by a surface of a first prismatic refractor having inclined substantially plane surfaces. The defined arrangement of the said two refractors offers a number of particular advantages, among which are the compensation of dispersive effects.

Various embodiments within the terms of the above definition may be devised.

The said refractors are preferably composed of a material having an absolute refractive index greater than air. The material between the refractors may be air, any other gas, or a liquid or solid material having an absolute refractive index greater than air.

Surface coatings on the refractors may be provided to counteract any secondary or stray reflections. Unwanted dispersive effects of the refractors which are not compensated by the defined configuration of the optical surfaces defining the boundaries of the refractors may be mitigated by the choice of refractor material, the geometry of the refractors, in particular the dispersive power (Abbé number), the apex angle and the orientation.

There is one other important element influencing image quality, namely geometric aberration. As generally understood this term is applied to all forms of image distortion. In the present context, however, the term "distortion" will be reserved for what may be defined as "lozenge distortion", namely the degree by which the ratio of the diagonal lengths of the image of a square or rectangular object differs from unity. In the present invention substantially uniform lateral compression of the image across the field of view is acceptable. Variability of this lateral compression is, however, not acceptable and is strictly controlled to maintain a substantially constant image size across the field of view, by careful choice of prism materials and geometry.

In one embodiment of the invention the reflecting means is formed as a component separate from the refractors. Alternatively, however, the reflecting means may be formed on one face of refractor by a coating of material having a higher refractive index than that of the refractor itself. In general this is achieved by silvering. In embodiments having a reflector separate from the second refractor a small separation or air gap between the reflector and the refractor may be provided.

The path length of light between the first and second refractors is preferably greater than the path length of light within them.

A further refractor may be located between the second refractor and the observer, preferably having two inclined substantially rectilinear interfaces convergent at a point coincident with or closely adjacent to the point of convergence of the interfaces defining the second refractor.

Embodiments of the present invention will now be more particularly described, by way of example, with reference to the accompanying drawings, in which.

Figure 1:
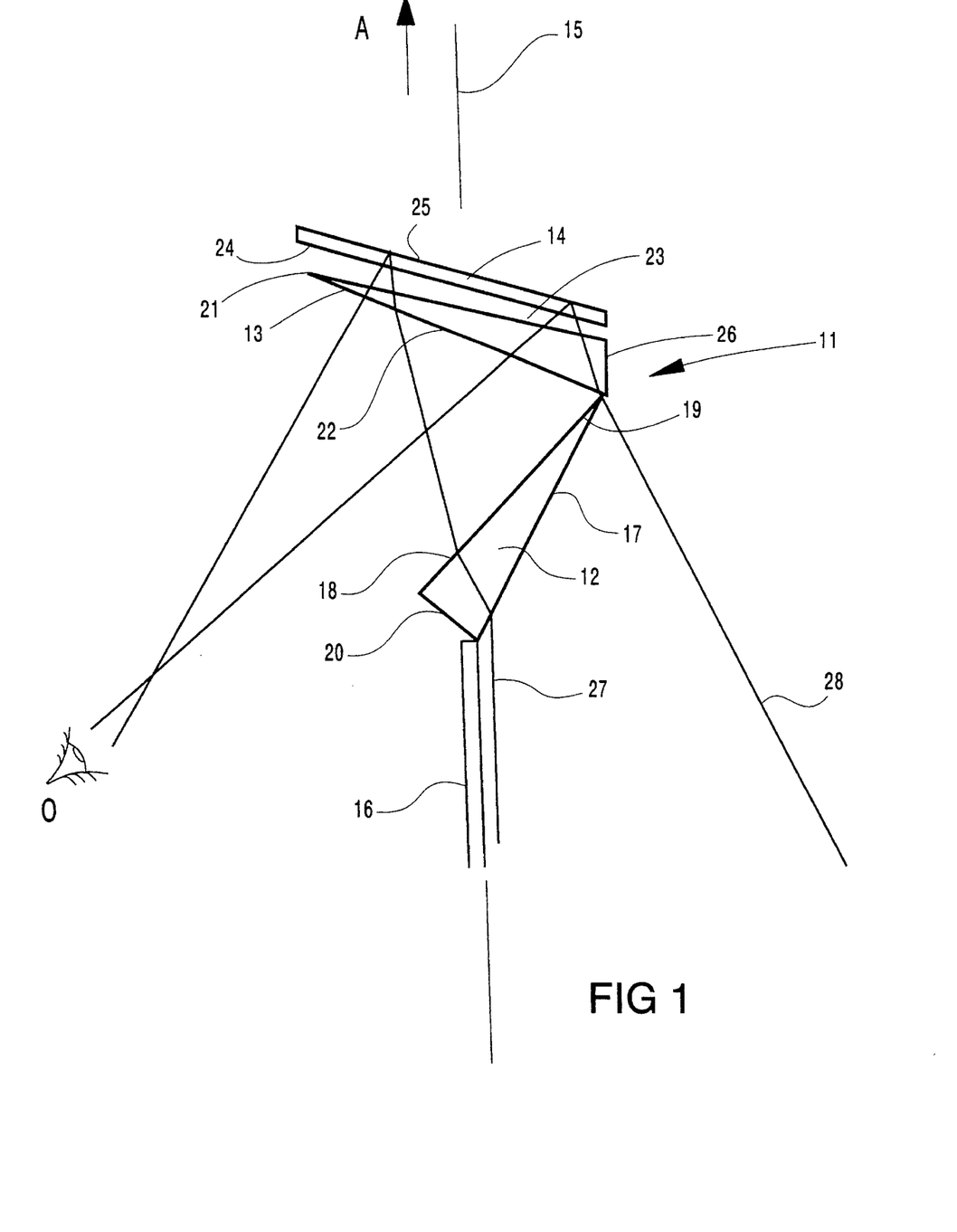
FIG. 1 is a schematic plan view from above of a first embodiment of the invention.

Referring first to FIG. 1, the mirror unit shown is generally indicated with the reference numeral 11 and comprises three basic optical components, namely an objective refractor 12, an ocular refractor 13 and a reflector 14. The line 15 represents the body line of a vehicle, the interior of the vehicle being to the left of the line 15 as viewed in FIG. 1. The arrow A indicates the direction of forward movement of the vehicle.

The rear view mirror unit 11 is positioned, as can be seen from FIG. 1, immediately forwardly of a transparent side screen 16, but is located in a position which is not traversed by a movable part of the transparent side screen. It will further be appreciated that the rear view mirror unit 11 is located partly within and partly outside the vehicle, extending approximately equally on either side of the body line 15 and forwardly of the location of the transparent side screen 16. This is achieved, for example, as will be seen from FIGS. 3 and 4, by locating the rear view mirror unit 11 in a door or other lateral component of the vehicle.

The objective refractor 12 in this embodiment is a prismatic transparent element with an acute angle between two major substantially planar faces 17, 18, the first of which may be identified as the "incident" face and the second of which can be considered as the "exit" face. The apex at the intersection of the two inclined faces 17, 18 is indicated with the reference numeral 19; opposite the apex 19 is a "heel" surface 20. The apex 19 of the objective refractor 12 is positioned laterally of the body line 15 and outwardly thereof. It will be appreciated that the cross section of the objective refractor 12 shown in FIG. 1 represents a prismatic body in which the two inclined faces 17, 18 are both orthogonal to the same (imaginary) plane to which the line defining the apex 19 is normal. In other embodiments, however, these two faces may alternatively be inclined at an angle less than 900 to this imaginary plane at angles which may be different from one another.

The ocular refractor 13 likewise comprises a prismatic optically transparent element having two substantially planar shallowly inclined surfaces 22, 23 which meet at an apex 21. The ocular refractor 13 further has a "heel" face 26 opposite the apex 21, and this "heel" is located adjacent the apex 19 of the objective refractor 12. The surfaces 22, 23 of the ocular refractor 13, and/or the surfaces 17, 18 of the objective refractor 12, may be coated with appropriate layers of material to reduce chromatic or other aberrations and to minimize reflection at the interfaces defined by the surfaces.

As with the objective refractor described above the surfaces of the ocular refractor may have an inclination perpendicular to the plane of the drawing as well as the inclination in the plane of the drawing as shown .

The reflector 14 is a plane element having an incident surface 24 and a reflecting surface 25. In the illustrated embodiment the surface 24 is substantially parallel to the surface 23 of the ocular refractor 13. Of course, in other embodiments a non-planar reflector may be used, and even if a planar reflection is used this need not necessarily be parallel to the surface 23. Indeed the inclination of the reflector to this surface 23 may be used as a design variant for specific geometric and chromatic qualities of the image. As with the refractor interfaces, the angle between the reflector 14 and the face 23 of the ocular refractor is not restricted to the plan view angle shown in FIG. 1, but may also include the angle measured in a plane normal to the drawing; that is, the distance between the reflector and the refractor may be different at the top from the bottom.

Optical properties which need to be measured or calculated in order to design a device having satisfactory performance include field of view, image size and variation of image size across the field of view, as well as the so-called 'lozenge' distortion defined above, chromatic aberration and binocular misalignment. Field of view and image size are interrelated for a given physical device size such that, for example, by increasing the object prism apex angle, field of view may be increased and image size reduced. Lozenge distortion is affected by the angle perpendicular to the drawing of the prism, for example, and chromatic aberration is influenced principally by the relative dispersive effects of the two prisms separately. Both these phenomena also vary across the field of view, and in the case of lozenge distortion, optical acceptability depends not only on the maximum value lying with a specific range but also on the variation. Binocular misalignment occurs only when non-planar surfaces are involved, such as when a convex reflector is used (otherwise parallel entry rays traverse the system and emerge still parallel). This misalignment is accommodated by the human eyes when it occurs in any plane through both eyes, as in normal naked eye binocular viewing of close-up objects, but not when it occurs normal to this plane. This aberration, which also occurs in non-prismatic mirrors, is controlled by, for example, the angle perpendicular to the drawing of the ocular prism. However, it should be understood that a complex interplay exists between all these optical properties and the design parameters available within the specified arrangement.

Light from the region to one side and behind the vehicle identified by the ambinocular limit rays 27, 28 and arriving at the incident surface 17 of the objective refractor 12 is refracted thereby towards the ocular refractor 13, from whence it is refracted towards the reflector 14 at the reflecting surface 25 of which it is reflected back towards the observer indicated by the letter O and the eye symbol, passing a second time through the ocular refractor 13.

The orientation of the objective refractor 12 and ocular refractor 13, with their apices 19 and 21 respectively on opposite sides of the median plane defined by the body line 15, allows the observer 0 to view the surface 22 of the ocular refractor 13 directly. The path length of the light rays through the refractors, together with the angles through which the light is refracted by these refractors ensures that the angle subtended by the surface 22 at the position of the observer is sufficient large, preferably of the same order of magnitude as the angle subtended by a conventional exterior mirror, but in any case large enough for a pair of parallel rays, one bound for each eye, to pass simultaneously through the optical system. This requires an exit pupil at least as great as the intraocular distance (65 mm) and preferably somewhat larger to accommodate a range of positions around that naturally adopted by the driver's head when the driver is in the driver's seat.

Figure 2:
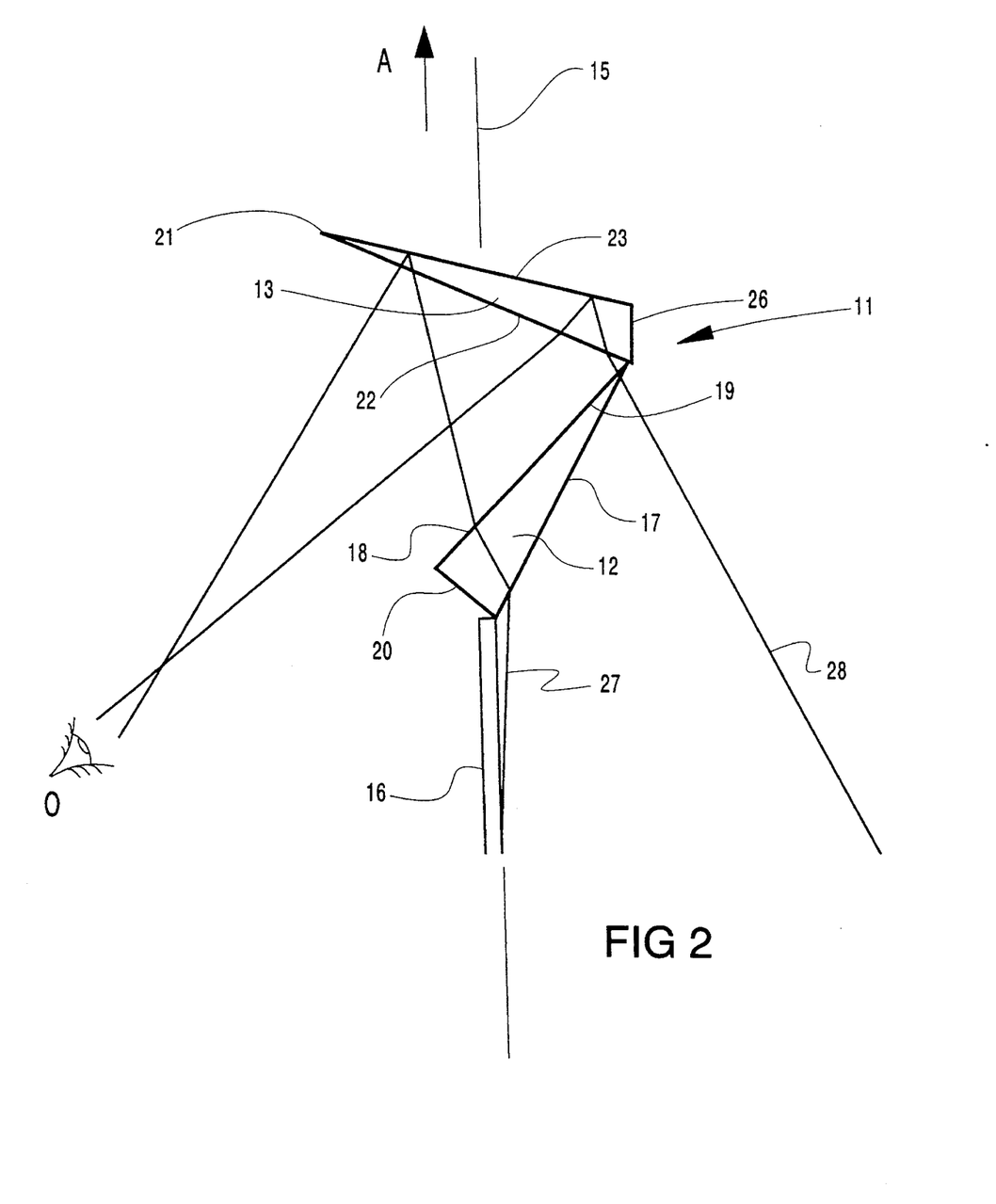
FIG. 2 is a schematic plan view from above of a second embodiment of the invention.

The embodiment illustrated in FIG. 2 is similar to that described in relation to FIG. 1, and those components which are identical or serve the same purpose are identified with the same reference numerals. The difference between the embodiment of FIG. 1 and that of FIG. 2 lies in the fact that the reflector 14 of the embodiment of FIG. 1 is not formed as a separate element but rather the rear surface 23 of the ocular refractor 13 is formed as a reflecting surface by an appropriate coating (not illustrated).

Figure 3:
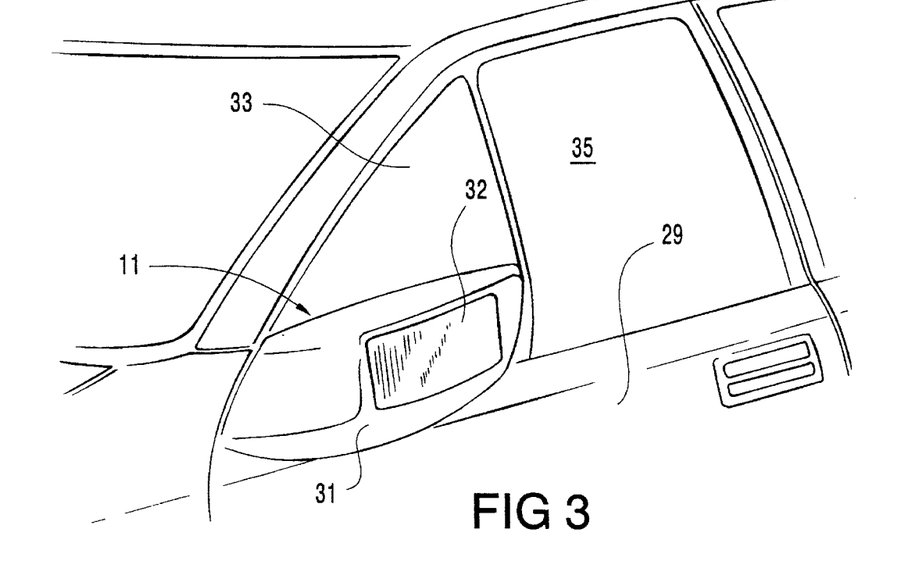
FIG. 3 is a schematic perspective view from the exterior of a motor vehicle of a rear view mirror unit formed according to the principles of the present invention.
Figure 4:
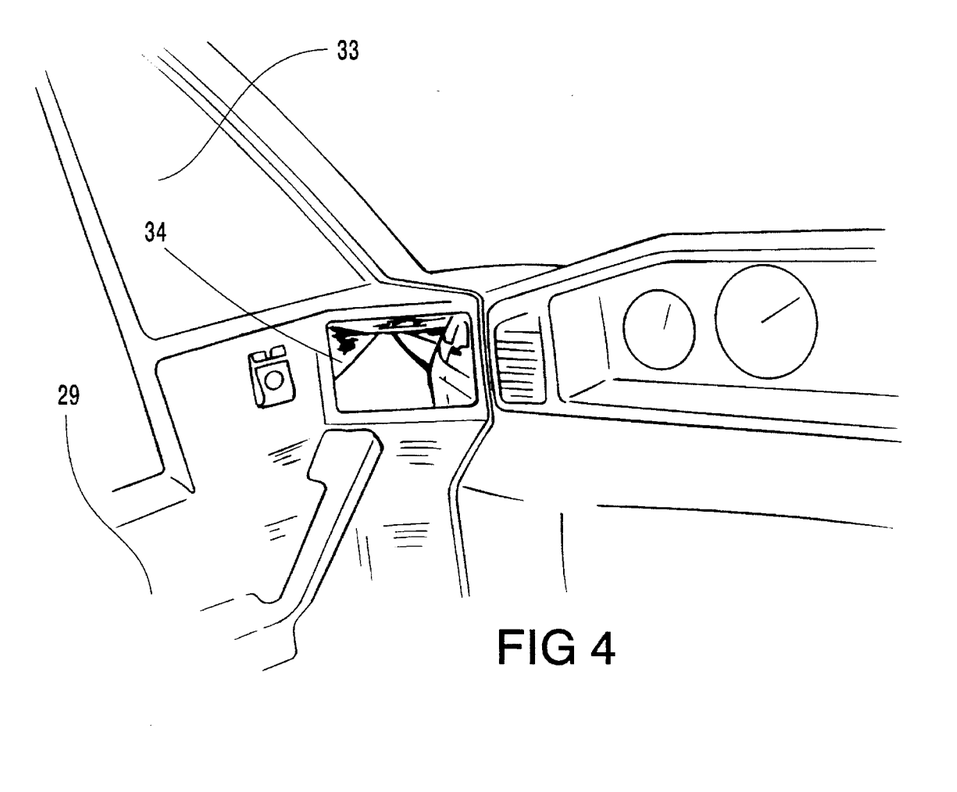
FIG. 4 is a perspective view from within the vehicle illustrating a rear view mirror unit formed according to the principles of the invention.

The external configuration of the reflector unit 11 of the present invention is illustrated in FIGS. 3 and 4 and it can be seen that the system is housed in the door structure in a position such that the components of the unit are concealed within the interior of a door 29. The parts of the unit which protrude into the vehicle interior are concealed by appropriate configuration of the area surrounding the viewing aperture through which the surface 22 of the ocular refractor 13 can be observed.

The exterior surface of the unit is streamlined by the provision of a cowling having an aperture 32 which may include light deflecting elements or may be defined by the surface 17 or the objective refractor 12.

The door 29 has a movable side screen 35 and a fixed quarter light 33 below which latter the mirror unit 11 is located. The mirror unit 11 therefore does not interfere with the movement of the side screen and, furthermore, does not have to accommodate the presence or absence of the side screen 35 as an optical component.

Figure 5:
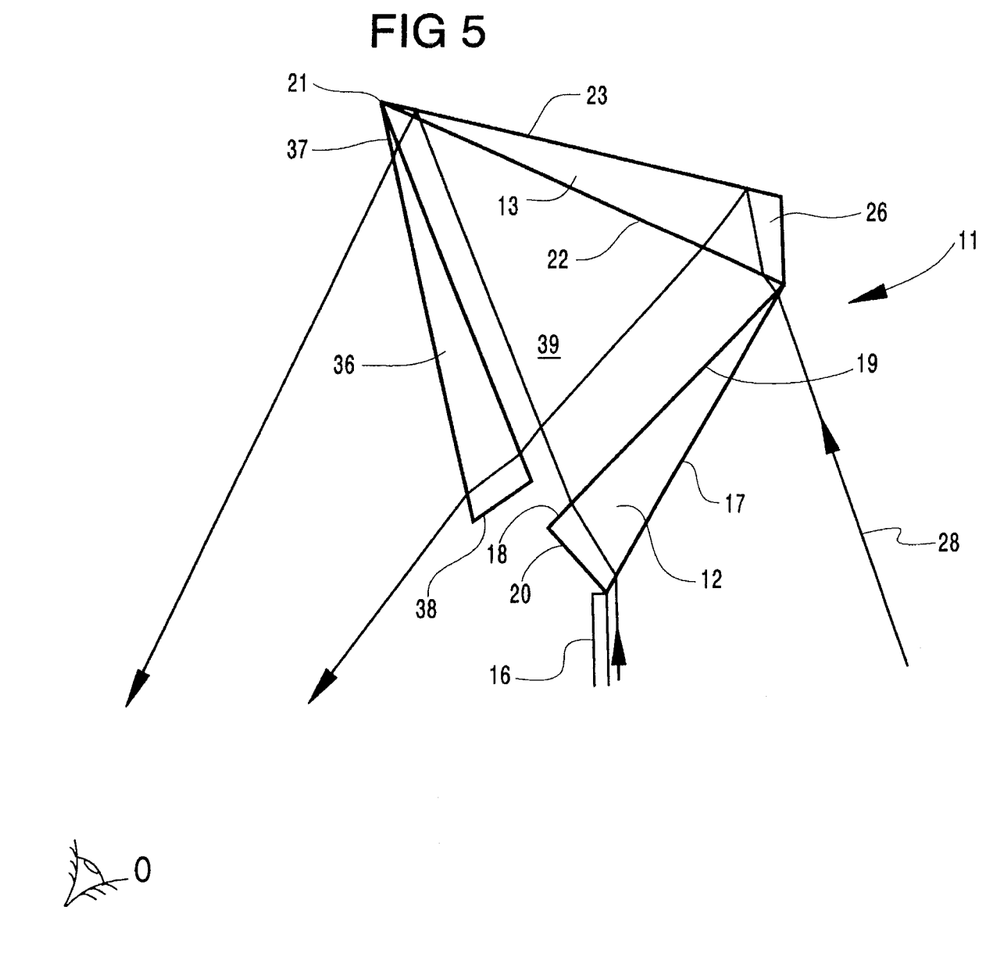
FIG. 5 is a schematic plan view illustrating the major components of a further embodiment of the invention.

FIG. 5 illustrates an embodiment similar to that of FIG. 2, and the same reference numerals have been used for corresponding components. This embodiment differs from that of FIG. 2 in that it has an additional refractor prism 36 in the path of light from refractor 13 to the observer, with its apex 37 closely adjacent the apex 21 of the ocular prism 13 and its wide end or "heel" 38 closely adjacent the wide end or "heel" 20 of the objective prism 12. The three prisms could in fact be positioned in contact with one another to allow the volume 39 enclosed by the three prisms to be filled with a material having a refractive index different from that of air. This filling may be a solid, a liquid or a gas. In the latter two cases, two additional end covers are required to retain the filling in place.

Figure 6:
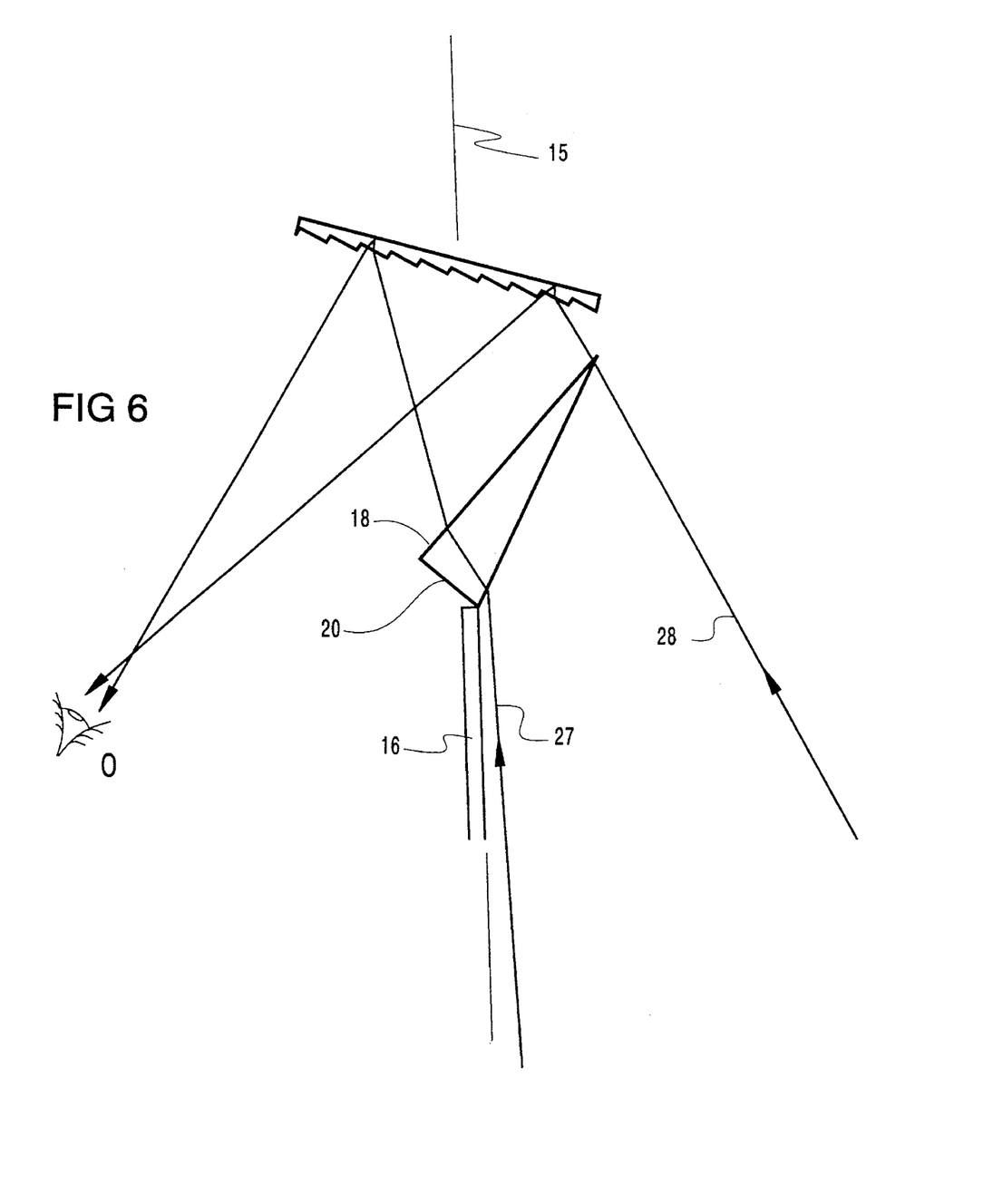
FIG. 6 is a schematic view illustrating the major components of an alternative embodiment of the invention employing a Fresnel prism as the ocular refractor.

The embodiments described hereinabove employ planar prisms as the refractors. It is within the ambit of the present invention, however, to employ refractors in which the optical surfaces are not single planes but formed as a plurality of surface elements, that is refractors formed as Fresnel prisms, reflectors or lenses. The essential difference between a conventional prism refractor or lens and a Fresnel component of the same type, lies in the fact that a Fresnel optical component has at least one of its faces formed as a plurality of elementary surfaces having the same inclination as the corresponding surface element of the equivalent optical component, but with all the elementary surfaces being spaced at substantially the same distance from an opposite boundary surface of the component. Thus a Fresnel prism may be bounded by two generally parallel planes one constituting a conventional optical surface and the other comprising a plurality of elementary surfaces or facets, all inclined at the same angle and each spaced from the conventional optical surface by the same distance. An example of such a structure is illustrated in FIG. 6. Of course both opposite faces may be formed as arrays of elementary surfaces.

Referring now to FIG. 6, the rear view mirror unit comprises an objective refractor 12 the position and orientation of which, with respect to the transparent side screen 16, is substantially the same as in the embodiment of FIG. 1 and 2. The same reference numerals for the various components of this objective refractor and the transparent side screen have therefore been used.

Figure 7:
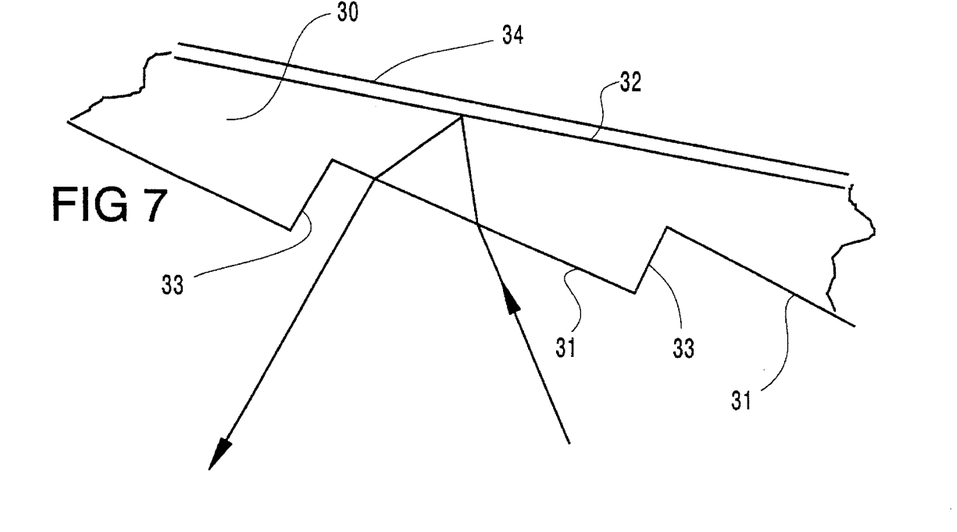
FIG. 7 is a schematic view on an enlarged scale illustrating the form of the ocular prism in the embodiment of FIG. 6.

The ocular refractor, on the other hand, as shown in FIG. 7, now identified with the reference numeral 30, is provided with a plurality of individual facets 31 each inclined to the rear face 32 of the refractor 30 by the same angle as the angle between the front and rear faces 22, 23 of the refractor element 13 of the embodiment of FIGS. 1 and 2. In this case, however, each individual refracting surface 31 is spaced by the same distance from the rear face 32 as all the others. Between each adjacent face 31 is a shoulder 33 which, as can be seen in FIG. 7, is substantially parallel to the exit ray. As will be appreciated from a consideration of, for example, FIGS. 1 or 2 where the ambinocular limit rays are illustrated, over the length of the refractor 30 the inclination of the exit ray to the general plane of the refractor varies over a small angle and, clearly, the inclination of the shoulder face 33 can likewise be varied such that it plays no part in the refraction of the light. As in the embodiment of FIG. 2, the refractor 30 is provided with a surface coating 34 to make the rear surface 32 a reflective face.

It will be apparent that not all the light entering the Fresnel device necessarily emerges in the desired direction; some may be deflected in other directions while some may be either randomly scattered or extinguished. Likewise, light from other than the object may enter the system and be directed towards the observer. This errant behavior typically arises from both design and manufacturing constraints, and is generally present to some degree. However, it is not the fact that losses occur which is generally important in imaging devices such as here, but that no significant amount of light from other than the object enters the eye, otherwise image contrast may suffer (from randomly introduced light) or, worse, ghosted images may appear (from systematically introduced light). Careful design of Fresnel risers and the use of matte black surfaces at critical locations generally deal with this problem.

Figure 8:
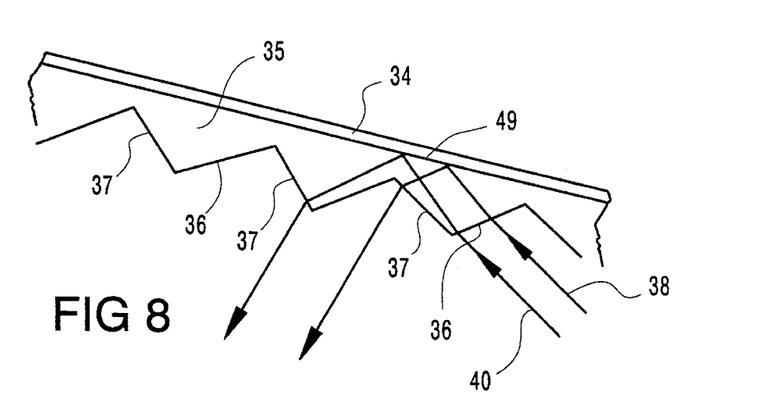
FIG. 8 is an enlarged schematic plan view of a first alternative ocular prism suitable for use in the embodiment of FIG. 6.

In FIG. 8, the objective refractor is again of substantially the same form as in FIG. 6, but the ocular refractor is of different form, in this case, instead of having inclined facets 31 and shoulders 33 parallel to the exit ray, this ocular prism, now identified with the reference numeral 45, has two sets of inclined facets 46, 47 the latter of which are inclined substantially parallel to the incident ray such that only the facets 46 are impinged by the incident rays. The facets 47, however, also act as refracting interfaces for the exit rays. Two typical rays are illustrated in FIG. 7, the first of which, ray 48, is incident on a facet 46, refracted thereby, reflected at the rear face 49 (which, like the embodiment of FIG. 7, is provided with a reflective coating 34) and then refracted at the next adjacent oppositely inclined facet 47.

The other illustrated ray, identified with reference numeral 40, passes too close to the first adjacent exit surface or facet 47 and is therefore reflected to the next facet 47 in the array, but since these are at substantially the same angle the two exit rays are substantially parallel to one another like the two incident rays.

Figure 9:
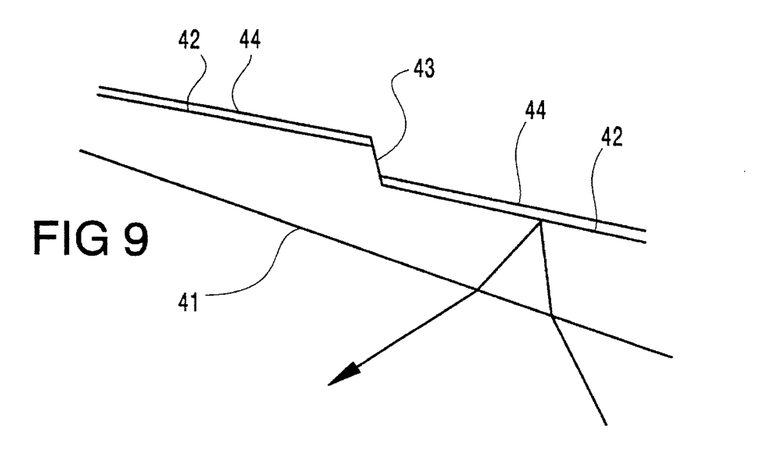
FIG. 9 is a schematic view of a second alternative ocular prism suitable for use in the embodiment of FIG. 6.

FIG. 9 illustrates an alternative form for the ocular refractor which, in place of the planar rear face is provided with a planar front or incident face 41 and a rear face formed as a plurality of inclined elementary surfaces 42 spaced by inclined shoulders 43. Again a coating 44 is formed on the surface elements 42 such that these act as reflectors to reflect light refracted at the front face 41.

These three optical arrangements may equally well be employed for the objective refractor 12 with the exception of the position of the reflecting coating which, of course, is not relevant for the objective refractor.

It may, however, equally well be formed as a Fresnel refractor with the surface elements formed on one face or the other and arranged such that only surface elements of a given inclination take part in the refraction (that is with separating shoulders parallel to the incident or refracted rays as appropriate) or with opposite inclined facets both of which may take part in the refraction.

Furthermore, the refracting facets, for example the facets 31 of FIG. 7, the facets 46 and 47 of FIG. 8 or the facets 42 of FIG. 9 need not all be parallel to one another, but may be progressively inclined to act as convergent or divergent lenses or mirrors as appropriate, whereby to provide enlargement or reduction of the image. Reduction of image size may be desirable, for example as a corollary to an extended field of view, whereas enlargement of the image size may be desirable for concentrating attention on the particular area for example, in the location where a motor vehicle may be overtaking.

Moreover, regardless of whether the reflector is a separate element as in the embodiment of FIG. 1 or integral with the ocular refractor as in the other embodiment, and independently of whether it is a continuous element or an array of elementary surfaces (Fresnel type) the reflecting surface may be planar, spherical, cylindrical or aspheric. Moreover, the reflector may be a formed surface in the relevant optical element or may be a deformation of the relevant optical element.

I claim:

1. A rear view mirror unit in which the light from a region behind an observer is directed to the observer's eye by an optical system, comprising:

means for reflecting;

means for refracting having a first refractor and a second refractor;

said first refractor having at least one first substantially planar refractor face and at least one second substantially planar refractor face, said at least one first and second substantially planar refractor faces being inclined to one another at a non-zero angle less than 90°, said first refractor operating to direct light incident on said at least one first face thereof towards said second refractor;

said second refractor being positioned such that light from said first refractor is incident thereon and having at least one first substantially planar refractor face operating to direct light arriving from said first refractor towards said means for reflecting and to direct light arriving from said means for reflecting, after having been reflected thereby, towards said observer; and said at least one first substantially planar refractor face of said second refractor being traversed by said light twice, once in each of two substantially opposite directional senses, before reaching said observer.

2. A rear view mirror unit as recited in claim 1, wherein said second refractor has at least one second substantially planar face inclined at a non-zero angle less than 90° with respect to said at least one first substantially planar refractor face of said second refractor.

3. A rear view mirror unit of claim 2, wherein at least one surface of at least one of said first refractor and said second refractor is formed as a plurality of elementary faces each spaced from the adjacent said plurality of elementary faces such that adjacent elementary faces are not coplanar.

4. A rear view mirror unit of claim 2, wherein said means for reflecting of said unit is formed as a reflecting component separate from said first refractor and said second refractor thereof.

5. A rear view mirror unit of claim 2, wherein said means for reflecting is formed as a reflecting surface of said second refractor.

6. A rear view mirror unit as recited in claim 1, wherein said means for reflecting of said unit is formed as a reflecting component separate from said first refractor and said second refractor thereof.

7. A rear view mirror unit as recited in claim 1, wherein said means for reflecting is formed as a reflecting surface of said second refractor.

8. A rear view mirror unit of claim 1, wherein said second refractor is formed as a Fresnel refractor with plurality of elementary faces defining at least one surface thereof.

9. A rear view mirror unit of claim 8, wherein said plurality of elementary faces define said surface of said second refractor nearest said observer and an opposite surface of said second refractor is formed with a reflective coating.

10. A rear view mirror unit of 1, wherein said first refractor is formed as a Fresnel refractor with a plurality of elementary faces defining at least one surface thereof.

11. A rear view mirror unit as recited in claim 1, wherein said first and second refractor faces of said first refractor converge towards one lateral side of the path of light incident on said first refractor in passing through said unit and said first and second refractor faces of said second refractor converge towards the opposite lateral side of the path of light incident on said second refractor in passing through said unit.

12. A rear view mirror unit in which the light from a region behind an observer is directed to the observer's eye by an optical system, comprising:

means for reflecting;

means for refracting having an objective refractor and an ocular refractor from which light passing through said unit is directed towards said observer;

said objective refractor having at least one first objective face and at least one second objective face, said first and second objective faces being inclined with respect to one another at a non-zero angle less than 90° such that light incident on said at least one first objective face is transmitted through said objective refractor to said at least one second objective face without reflection in its passage through said objective refractor, said ocular refractor having at least one first ocular face and at least one second ocular face, said first and second ocular faces being inclined with respect to one another at a non-zero angle less than 90° such that light arriving at said ocular refractor from said objective refractor and entering through said at least one first ocular face is directed thereby towards said means for reflecting, the orientation of said means for reflecting being such that after reflection said light passes a second time through said ocular refractor and exits through said at least one first ocular face towards the observer.

13. A rear view mirror unit of claim 12, wherein said ocular refractor is formed as a Fresnel refractor with a plurality of elementary faces defining at least one surface thereof.

14. A rear view mirror unit of claim 12, wherein said objective refractor is formed as a Fresnel refractor with a plurality of elementary faces defining at least one surface thereof.

15. A rear view mirror unit of claim 12, wherein a plurality of elementary faces define a surface of said ocular refractor nearest said observer and an opposite surface of said ocular refractor is formed with a reflective coating.

16. A rear view mirror unit of claim 12, further comprising:

a refractor prism positioned in the path of light from said ocular refractor to said observer.

17. A rear view mirror unit as recited in claim 12, wherein said first and second inclined refractor faces of said objective refractor converge towards one lateral side of the path of light, incident on said objective refractor and said first and second inclined faces of said ocular refractor converge towards the opposite lateral side of the path of light incident on said ocular refractor.

18. A rear view mirror unit in which light from a region behind an observer is directed to the observer's eye by an optical system comprising:

means for reflecting:

means for refracting having an objective refractor and an ocular refractor from which light passing through said unit is directed towards said observer, said ocular refractor defining a refracting interface which is traversed twice by said light passing through said unit;

said unit further comprising a refractor prism positioned in said path of light from said occular refractor to said observer:

wherein said objective refractor, said ocular refractor and said refractor prism form a substantially triangular configuration.

19. A rear view mirror unit in which light from a region behind an observer is directed to the observer's eye by an optical system, comprising:

means for reflecting;

means for refracting having a first refractor and a second refractor;

said first and second refractors being positioned and oriented such that incident light passes through and is refracted by said first and second refractors in turn before being reflected by said means for reflecting and then passes through and is refracted by said second refractor a second time on its way towards the observer;

said second refractor at least substantially compensating for chromatic dispersion of said light introduced upon transmission through said first refractor.

* * * * *